H. HOOVER.
Wheel-Cultivator.
No. 57,906.　　　　　　　　　　　　　　　　　Patented Sept. 11, 1866.
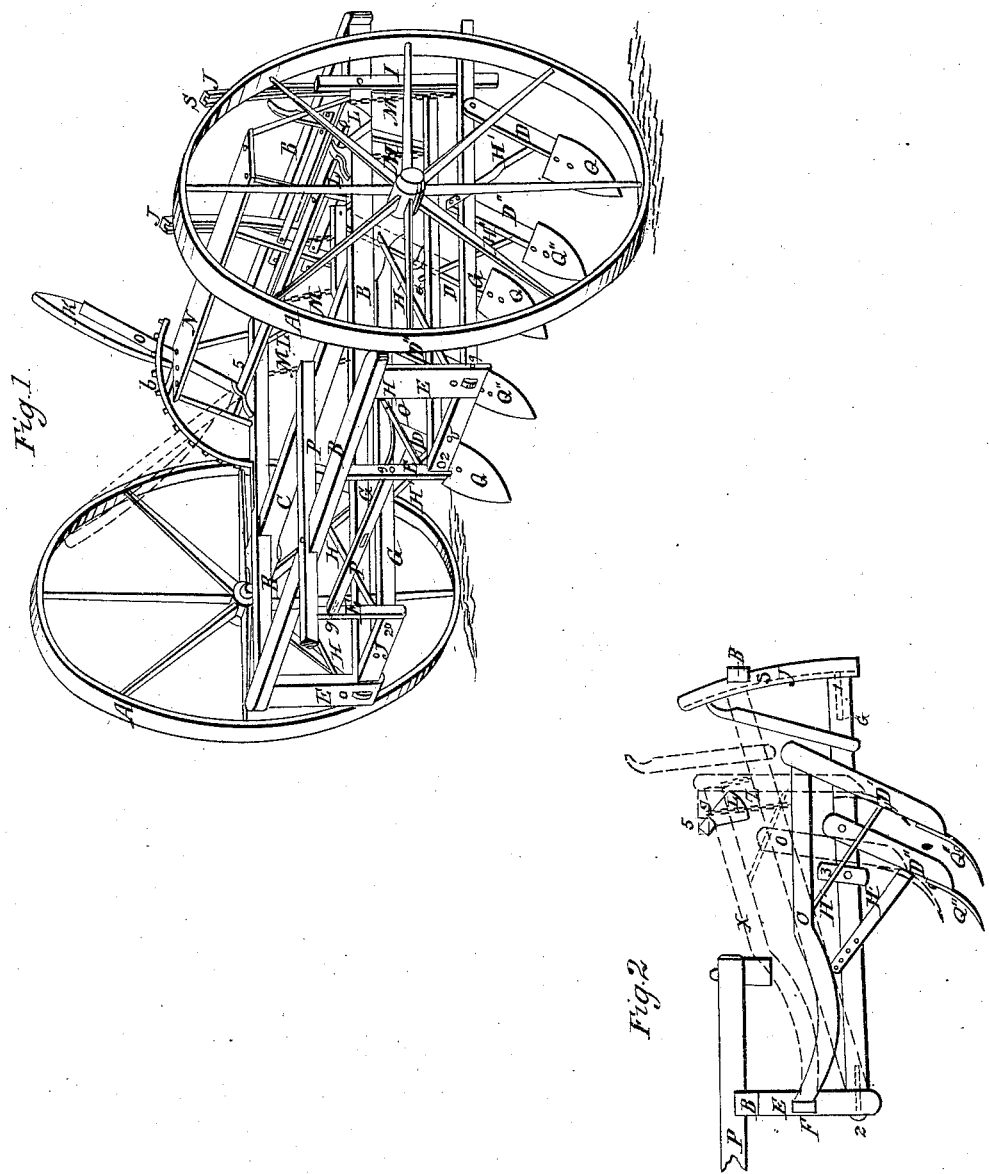
Witnesses.
A. Hayward.
J. L. Marvin.
Inventor.
Henry Hoover.

UNITED STATES PATENT OFFICE.

HENRY HOOVER, OF HEMLO, ILLINOIS.

IMPROVEMENT IN CULTIVATORS.

Specification forming part of Letters Patent No. 57,906, dated September 11, 1866.

*To all whom it may concern:*

Be it known that I, HENRY HOOVER, of Hemlo, in the county of Du Page and State of Illinois, have invented a new and useful Improvement in Cultivators; and I do hereby declare that the following is a full, clear, and exact description thereof, reference being had to the accompanying drawings, and letters of reference marked thereon, making a part of this specification, in which—

Figure I is a perspective representation of my improvement in cultivators. Fig. II is a sectional elevation of the same, showing the peculiar construction of the central shovel-beam and its connection with the other parts of the cultivator.

The nature of my invention consists in the use of segment-guides in which are made grooves for guiding the rear end of the beams supporting the shovels which are used near the rows of corn to be tilled. By this arrangement the beam may be kept in position, whether adjusted to plow much or little, in the ground, and a lateral motion obviated; and further, in the use of a central shovel attached to a crooked beam which may be elevated independently of the other beams in order that the shovel may be carried far enough above the ground to pass over the corn when cultivating the same.

By means of this construction the cultivator can be used for tilling crops when planted in rows and for covering seed when sown broadcast, or for other purposes where the ground is to be stirred, thus requiring but one cultivator to perform several kinds of work.

To enable others skilled in the art to make and use my invention, I will describe the method of construction and operation.

C A represent the common axle and wheels which support the cultivator-frame B B B B. E E are the frames attached to the front part of the frame B, and projecting downward to provide a support for the rollers, and to which the front end of the inner beams G are hung by means of the bolts 2, so that the shovels attached to these beams may be worked to or from the rows of corn, as desired, by means of the feet of the operator and the steps 3.

The front end of the outer beams G pass through mortises made in the frames E E, of such width as will allow the rear end of the beam to be raised or lowered, the bolts 4 holding the beam in the mortises. 5 is the shaft, resting on the frame B B B B, and supporting the cams L, which are used in conjunction with the chains M, lever K, and rack 6, when regulating the shovels for running the required depth in the ground, and for raising the shovels above the ground when they are not desired for use.

J represents the segment-guides, attached to the rear part of the frame B, having the grooves S, in which operates the round tenons 1, rigidly secured to the rear ends of the inner beams G.

I consider the guides J an important attachment to the cultivator, from the fact that the beams can be elevated in a vertical plane, and yet revolve enough to allow the shovels to be worked among crooked rows of corn.

D D'' is the shovel-standards attached to the beams G, and supported by means of the braces H', in the usual manner. O is the central shovel-beam, supporting the shovel-standard D', which is only used when covering seed sown broadcast and stirring the ground, in which case it will occupy the position which will allow the shovel Q' to run the same depth in the ground as the shovels Q Q''; but when cultivating corn and other crops planted in rows, the beam must be raised up and attached to the shaft 5 by means of the chain 7 and the hook 8, as seen by the dotted lines X, Fig. II, in order that the shovel Q' may be carried over the row.

The roller F is held in position between the frames E E by means of the bolts 9, which allow the beam O to be elevated as described.

Operation: The horses can be attached to the tongue P in the usual manner, and the driver can occupy the seat N, and rest his feet on the steps 3, and guide the shovels Q'', and also regulate the height of the shovels by means of the lever K. The central shovel, Q', being operated independently of the others, can be regulated as above described.

Having thus described my invention, what I claim, and desire to secure by Letters Patent of the United States, is—

1. The arrangement and combination of the central beam O, shovel-standard D', shovel Q', with the central roller F and shaft 5, when constructed substantially as and for the purpose specified.

2. The segment-guides J, having the grooves S, in combination with the inner beams G, rollers and shovel-standards D'', shovels Q'', cams L, and shaft 5, substantially as described and set forth.

HENRY HOOVER.

Witnesses:
A. HAYWARD,
J. L. MERIAM.